(12) United States Patent
Liao et al.

(10) Patent No.: US 11,626,013 B2
(45) Date of Patent: Apr. 11, 2023

(54) TRAFFIC DATA ANALYSIS METHOD, ELECTRONIC DEVICE, VEHICLE AND STORAGE MEDIUM

(71) Applicant: APOLLO INTELLIGENT CONNECTIVITY (BEIJING) TECHNOLOGY CO., LTD., Beijing (CN)

(72) Inventors: Ruihua Liao, Beijing (CN); Yupu Huang, Beijing (CN); Shulong Lin, Beijing (CN); Yanwu Liu, Beijing (CN)

(73) Assignee: APOLLO INTELLIGENT CONNECTIVITY (BEIJING) TECHNOLOGY CO., LTD.

( * ) Notice: Subject to any disclaimer, the term of this patent is extended or adjusted under 35 U.S.C. 154(b) by 69 days.

(21) Appl. No.: 17/492,134

(22) Filed: Oct. 1, 2021

(65) Prior Publication Data
US 2022/0020267 A1 Jan. 20, 2022

(30) Foreign Application Priority Data
Dec. 16, 2020 (CN) .......................... 202011489927.8

(51) Int. Cl.
*G08G 1/01* (2006.01)
(52) U.S. Cl.
CPC ................. *G08G 1/0125* (2013.01)
(58) Field of Classification Search
CPC .... G08G 1/0125; G08G 1/052; G08G 1/0129; G08G 1/096716; G08G 1/096741; G08G 1/09675; G08G 1/0112; G08G 1/0104; G06Q 30/0259; G06N 3/08; G06N 20/00; H04W 4/023; H04W 4/44

USPC ......................................................... 340/933
See application file for complete search history.

(56) References Cited

U.S. PATENT DOCUMENTS

| | | | |
|---|---|---|---|
| 2017/0351720 A1 | 12/2017 | Alekseyev et al. |
| 2018/0330012 A1 | 11/2018 | Hopkins et al. |
| 2018/0330610 A1 | 11/2018 | Wu |
| 2019/0025841 A1 | 1/2019 | Haynes et al. |
| 2019/0051171 A1 | 2/2019 | Malkes et al. |

(Continued)

FOREIGN PATENT DOCUMENTS

| | | |
|---|---|---|
| CN | 106205161 A | 12/2016 |
| CN | 106559634 A | 4/2017 |

(Continued)

*Primary Examiner* — Tai T Nguyen
(74) *Attorney, Agent, or Firm* — Husch Blackwell LLP

(57) ABSTRACT

A traffic data analysis method, an electronic device, a vehicle and a storage medium are provided, and relate to the technical field of artificial intelligence, in particular to the fields of large data processing, automatic driving and vehicle networking, and can be applied to AI navigation. The method includes: acquiring a plurality of initial traffic data; determining a category of each of the plurality of initial traffic data; receiving a search instruction from an AI analysis model, wherein the search instruction includes target category information; determining target traffic data corresponding to the target category information from the respective initial traffic data according to categories of the respective initial traffic data; and sending the target traffic data to the AI analysis model so that the AI analysis model performs an AI analysis according to the target traffic data.

19 Claims, 6 Drawing Sheets

(56) References Cited

U.S. PATENT DOCUMENTS

| | | | |
|---|---|---|---|
| 2020/0057923 A1 | 2/2020 | Song et al. | |
| 2020/0090502 A1* | 3/2020 | Yang | G08G 1/09626 |
| 2020/0209845 A1* | 7/2020 | Chen | G05D 1/0038 |
| 2020/0294403 A1 | 9/2020 | Tong et al. | |

FOREIGN PATENT DOCUMENTS

| | | |
|---|---|---|
| CN | 107346610 A | 11/2017 |
| CN | 108833476 A | 11/2018 |
| CN | 110096981 A | 8/2019 |
| CN | 110322688 A | 10/2019 |
| CN | 111397628 A | 7/2020 |
| CN | 111428506 A | 7/2020 |
| CN | 109657031 B | 8/2020 |
| CN | 111583639 A | 8/2020 |
| CN | 111897836 A | 11/2020 |
| WO | 2018103313 A1 | 6/2018 |

* cited by examiner

TRAFFIC DATA ANALYSIS METHOD, ELECTRONIC DEVICE, VEHICLE AND STORAGE MEDIUM

CROSS-REFERENCE TO RELATED APPLICATION

This application claims priority to Chinese patent application No. 202011489927.8, filed on Dec. 16, 2020, which is hereby incorporated by reference in its entirety.

TECHNICAL FIELD

The present disclosure relates to the field of artificial intelligence, and in particular to the fields of large data processing, automatic driving and vehicle networking.

BACKGROUND

At present, vehicles can basically only acquire a small amount of traffic data from a server to perform an AI (Artificial Intelligence) analysis, for example, analyzing congestion states of roads by using road condition data.

SUMMARY

The present disclosure provides a traffic data analysis method, apparatus, a device, a vehicle and a storage medium.

According to the first aspect of the present disclosure, a traffic data analysis method is provided, the method including:

acquiring a plurality of initial traffic data;

determining a category of each of the plurality of initial traffic data;

receiving a search instruction from an AI analysis model, wherein the search instruction includes target category information;

determining target traffic data corresponding to the target category information from the respective initial traffic data according to categories of the respective initial traffic data; and sending the target traffic data to the AI analysis model so that the AI analysis model performs an AI analysis according to the target traffic data.

According to the second aspect of the present disclosure, a traffic data analysis method is provided, the method including:

sending a search instruction to a traffic data processor, wherein the search instruction includes target category information;

receiving target traffic data sent by the traffic data processor, wherein the target traffic data is data corresponding to the target category information determined by the traffic data processor from respective initial traffic data according to categories of the respective initial traffic data; and performing an AI analysis according to the target traffic data.

According to the third aspect of the present disclosure, a traffic data analysis apparatus is provided, the apparatus including:

an acquisition module configured for acquiring a plurality of initial traffic data;

a first determination module configured for determining a category of each of the plurality of initial traffic data;

a receiving module configured for receiving a search instruction from an AI analysis model, wherein the search instruction includes target category information;

a second determination module configured for determining target traffic data corresponding to the target category information from the respective initial traffic data according to categories of the respective initial traffic data; and a sending module configured for sending the target traffic data to the AI analysis model so that the AI analysis model performs an AI analysis according to the target traffic data.

According to the fourth aspect of the present disclosure, a traffic data analysis apparatus is provided, the apparatus including:

a sending module configured for sending a search instruction to a traffic data processor, wherein the search instruction includes target category information;

a receiving module configured for receiving target traffic data sent by the traffic data processor, wherein the target traffic data is data corresponding to the target category information determined by the traffic data processor from respective initial traffic data according to categories of the respective initial traffic data; and an analysis module configured for performing an AI analysis according to the target traffic data.

According to the fifth aspect of the present disclosure, an electronic device is provided, the electronic device including:

at least one processor; and a memory communicatively connected to the at least one processor, wherein the memory stores instructions executable by the at least one processor, and the instructions are executed by the at least one processor, to enable the at least one processor to execute the method provided in the first aspect.

According to the sixth aspect of the present disclosure, a vehicle is provided, the vehicle including the apparatus provided in the second aspect and the apparatus provided in the fourth aspect.

According to the seventh aspect of the present disclosure, a non-transitory computer-readable storage medium storing computer instructions is provided, wherein the computer instructions are configured for causing a computer to execute the method provided in the above first aspect or third aspect.

According to the eighth aspect of an embodiment of the present disclosure, a computer program product including computer instructions is provided, wherein the computer instructions, when executed by a processor, implement the method provided in the above first aspect or third aspect.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to better understand technical solution(s) of the present disclosure and should not be constructed a limitation to the present disclosure. Wherein.

DETAILED DESCRIPTION

The exemplary embodiments of the present disclosure will be described below in combination with the accompanying drawings, including various details of the embodiments of the present disclosure to facilitate understanding, which should be considered as exemplary only. Therefore, those skilled in the art should realize that various changes and modifications can be made to the embodiments described herein without departing from the scope and spirit of the present disclosure. Likewise, descriptions of well-known functions and structures are omitted in the following description for clarity and conciseness.

Figure 1:
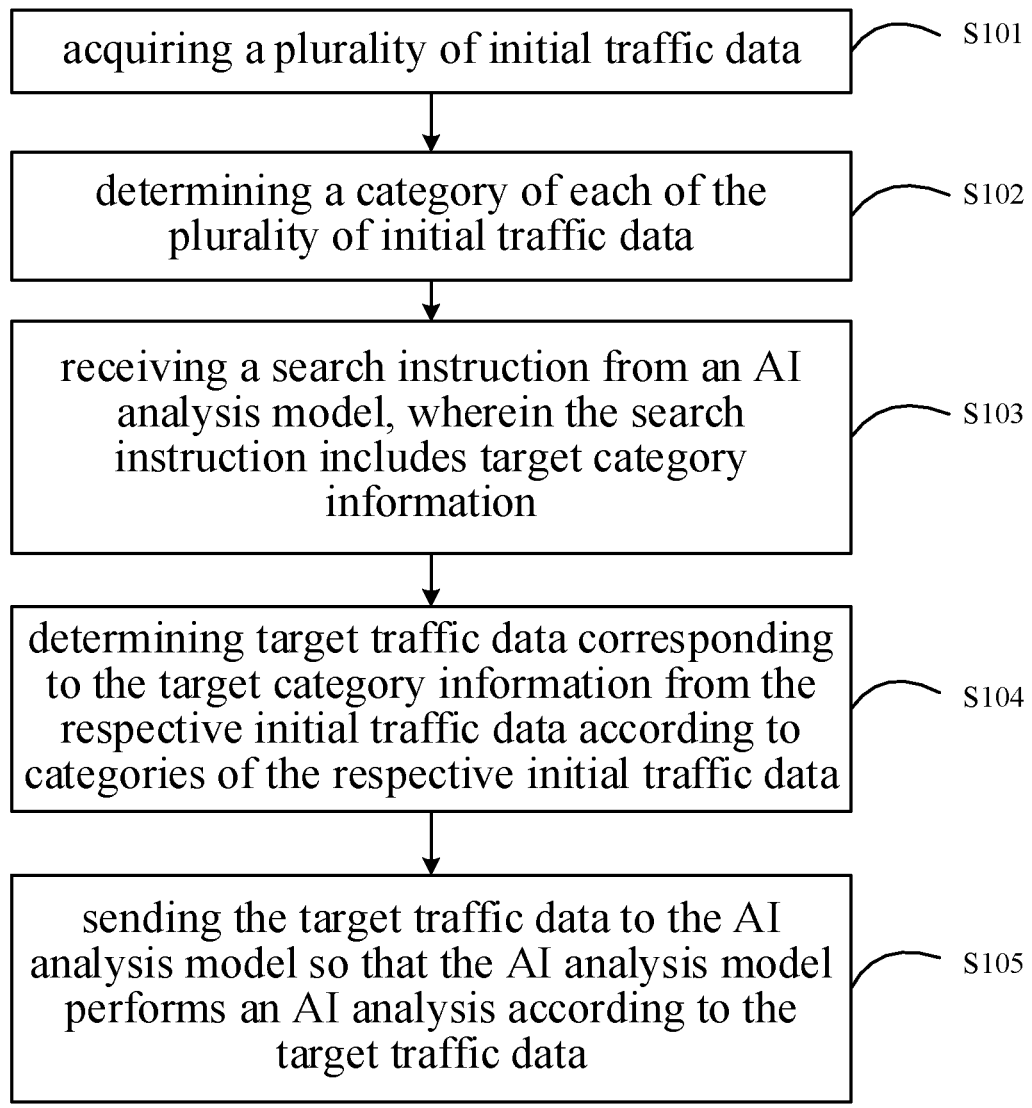
FIG. 1 is a first schematic flow diagram of a traffic data analysis method according to an embodiment of the present disclosure.

FIG. 1 is a first schematic flow diagram of a traffic data analysis method according to an embodiment of the present disclosure. As shown in FIG. 1, the analysis method can include:

S101, acquiring a plurality of initial traffic data;

S102, determining a category of each of the plurality of initial traffic data;

S103, receiving a search instruction from an AI analysis model, wherein the search instruction includes target category information;

S104, determining target traffic data corresponding to the target category information from the respective initial traffic data according to categories of the respective initial traffic data; and S105, sending the target traffic data to the AI analysis model so that the AI analysis model performs an AI analysis according to the target traffic data.

According to the analysis method of an embodiment of the present disclosure, the category of each of the plurality of initial traffic data is determined by first categorizing the acquired plurality of initial traffic data. Furthermore, in a case that a search instruction of an AI analysis model is received, based on target category information in the search instruction, its corresponding target traffic data can be quickly determined from respective initial traffic data, and the target traffic data can be quickly pushed to the AI analysis model, so that the AI analysis model performs an AI analysis based on the target traffic data, which can improve the efficiency of the AI analysis.

Further, since the target traffic data can be accurately provided to the AI analysis model through the correspondences between the categories of the initial traffic data and the AI analysis models, the analysis method is suitable for a large-scale AI analysis with a plurality of AI analysis models, thereby facilitating the improvement of the diversity of the AI analysis.

It should be noted that the traffic data analysis method of the embodiment of the present disclosure is applicable to fields of large data processing, automatic driving and Internet of Vehicles. For example, there are category processing of mass traffic data, AI navigation required for automatic driving using traffic data, and AI analysis required for the field of Internet of Vehicles using traffic data, etc.

In an example, the initial traffic data can be acquired from a server and/or a vehicle. Wherein, the server can be a traffic intelligence system, the initial data acquired from the server includes, but is not limited to, road data, road network data, and shop data from the position where the vehicle is located. The initial data acquired from the vehicle includes driving data of the vehicle acquired from the vehicle.

Illustratively, the road data includes, but is not limited to, position information, a name, length information, the number of lanes, and distance information of the next road from the position where the vehicle is located. The road network data includes, but is not limited to, position information, a name, length information, the number of lanes, steering information, and zebra crossing information of the surrounding road within a predetermined range from the position where the vehicle is located. The store data includes, but is not limited to, a store name, position information, price information, and scoring information. The driving data of the vehicle includes, but is not limited to, vehicle speed information, remaining amount of oil, and remaining amount of electricity of the vehicle.

In yet another example, there can be a plurality of categories of initial traffic data, and the categories of the initial traffic data and the number of the initial traffic data can be selected and adjusted according to actual needs, which is not limited by the embodiment of the present disclosure, as long as the initial traffic data can be categorized according to desired functions.

Illustratively, categories of the respective initial traffic data can include a self-vehicle intelligence category, an in-case intelligence category, and a peripheral road network intelligence category. Determining a category of each of the plurality of initial traffic data can include: marking a self-vehicle intelligence category for the driving data of the vehicle; marking an in-case intelligence category for the road data; marking a peripheral road network intelligence category for the road network data and shop data.

Illustratively, initial traffic data belonging to the same category can be divided into the same data group such that the initial traffic data of the same data group has the same category. In a case that the AI analysis model needs to call a certain category of target traffic data, all initial traffic data in the data group with the category can be sent to the AI analysis model.

In an example, there can be a plurality of AI analysis models having different analysis functions, each AI analysis model corresponding to one or more categories of initial traffic data. For example, the AI analysis models can include a first AI analysis model, a second AI analysis model, and a third AI analysis model, wherein the first AI analysis model corresponds to the vehicle speed information of the vehicle in the self-vehicle intelligence category, the second AI analysis model corresponds to the remaining amount of oil of the vehicle in the self-vehicle intelligence category and the position information of the next road in the in-case intelligence category, and the third AI analysis model corresponds to the vehicle speed information of the vehicle in the self-vehicle intelligence category, the position information of the next road in the in-case intelligence category, and the position information of a surrounding road and the position information of a shop in the peripheral road network intelligence category.

In this way, in a case of responding to an analysis instruction, respective AI analysis models can generate search instructions with target category information based on the correspondences between the respective AI analysis models and the initial traffic data in respective categories, and then in a case that a search instruction of an AI analysis model is received, the target traffic data can be determined from respective initial traffic data according to categories of the respective initial traffic data, and the accurate target traffic data can be quickly provided to the AI analysis model.

Illustratively, a search instruction of an AI analysis model can be generated by the AI analysis model in response to voice control information. For example, in a case of the AI analysis model receives voice control information "Searching the Nearest Store", the AI analysis model generates a corresponding search instruction.

In an example, there can be a plurality of types of AI analysis models depending on the application scenarios. For example, the AI analysis models include, but are not limited to, a yaw analysis model, a fuel analysis model, an avoidance congestion analysis model, a shop analysis model, etc.

For example, the shop analysis model can be a petrol station analysis model or a restaurant analysis model. The AI analysis function of the petrol station analysis model can include: analyzing a petrol station with the cheapest price from the position where the vehicle is located, by using target traffic data corresponding to the petrol station analysis model and determined from the respective initial traffic data. The AI analysis function of the restaurant analysis model can include: analyzing a restaurant with the best evaluation from the position where the vehicle is located, by using target traffic data corresponding to the restaurant analysis model and determined from the respective initial traffic data.

It can be understood that the AI analysis function of the AI analysis model can be selected and adjusted according to actual needs, and the embodiments of the present disclosure do not limit the specific AI analysis function of the AI analysis model.

In an implementation, before S104, the method can further include: performing error correction processing on the initial traffic data.

Wherein, performing the error correction processing on the initial traffic data can include: inputting the same category of initial traffic data into a corresponding error correction model, so that the error correction model performs the error correction processing on the corresponding initial traffic data.

For example, error correction models can include a self-vehicle intelligence error correction model, an in-case intelligence error correction model, and a peripheral road network intelligence error correction model. The self-vehicle intelligence category of initial traffic data can be input to the self-vehicle intelligence error correction model, the in-case intelligence category of initial traffic data can be input to the in-case intelligence error correction model, and the peripheral road network intelligence category of initial traffic data can be input into the peripheral road network intelligence error correction model for error correction processing, respectively.

For example, the correspondences between evaluation grades of shops and average scores are: the grade A corresponding to 4-5 points, the grade B corresponding to 2-3 points and the grade C corresponding to 0-1 points. In a case that an evaluation grade of a shop is input into the peripheral road network intelligence error correction model, if the evaluation grade of the shop is the grade A and the average score determined in the peripheral road network intelligence error correction model is 3 points, the evaluation grade of the shop is output as the grade B.

On basis of this, by performing the error correction processing on the initial traffic data, the accuracy of the initial traffic data can be improved, and then the accuracy of the AI analysis can be improved. In addition, by inputting the same category of the initial traffic data into the corresponding error correction model for error correction processing, it is beneficial to perform parallel error correction processing on various categories of initial traffic data, and the efficiency of error correction processing can be improved.

In an implementation, before S104, the method can further include: performing verification processing on the initial traffic data. In this way, the validity and integrity of the initial traffic data transmission can be verified, thereby improving the accuracy of the AI analysis.

Figure 2:
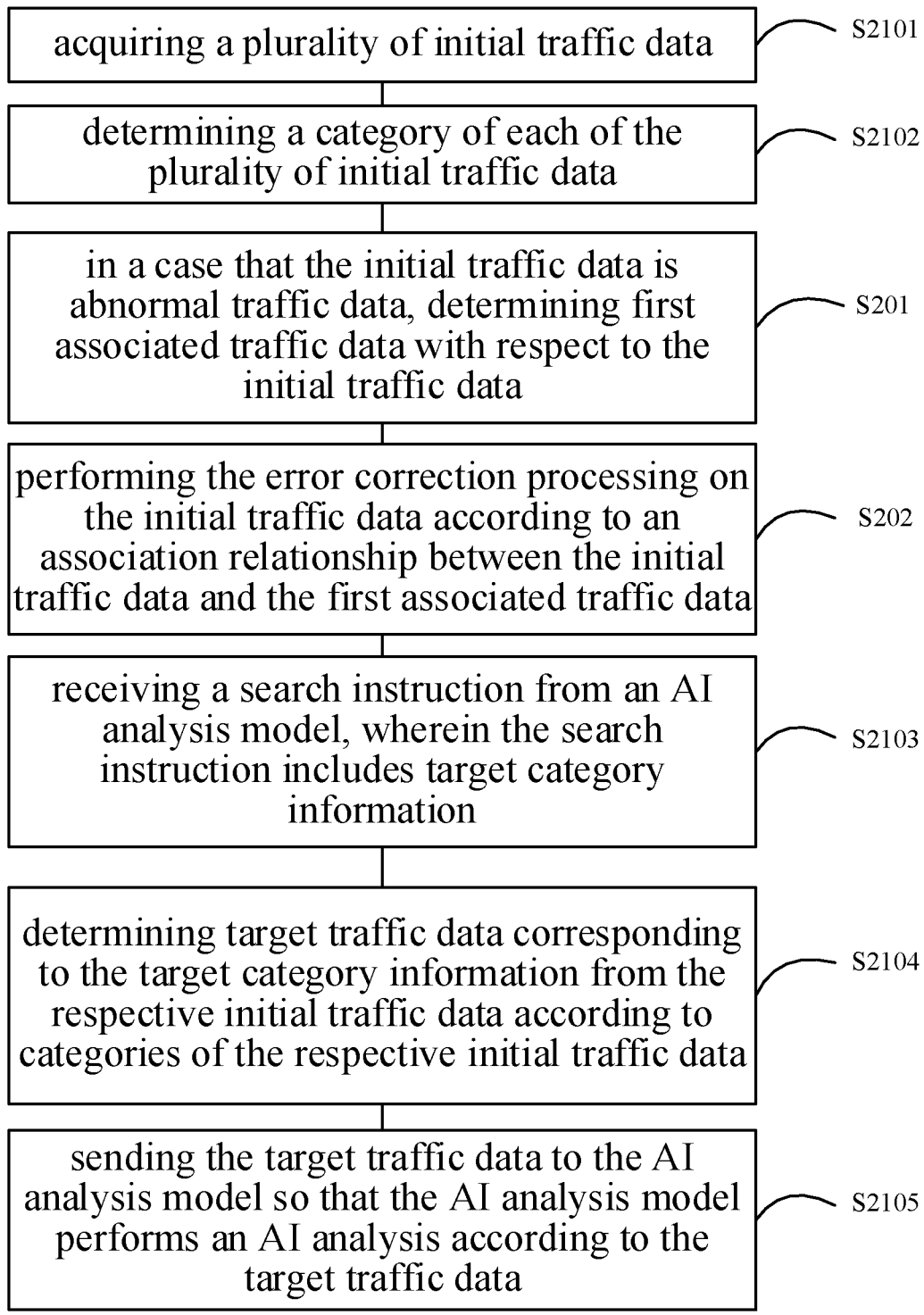
FIG. 2 is a second schematic flow diagram of a traffic data analysis method according to an embodiment of the present disclosure.
Figure 3:
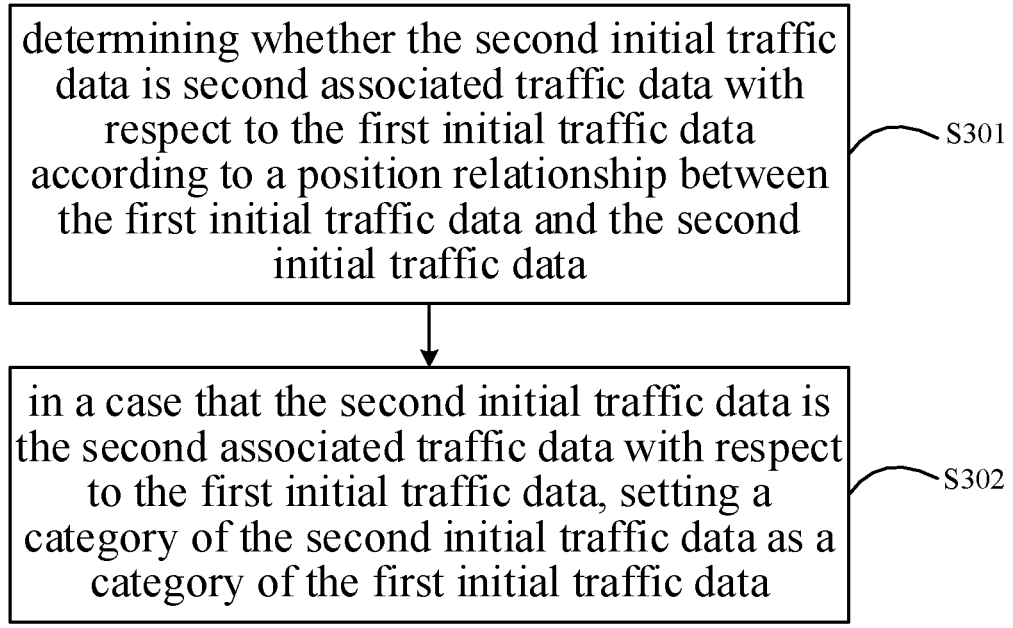
FIG. 3 is a schematic flow diagram of S102 according to an embodiment of the present disclosure.

In an implementation, as shown in FIG. 2, S2101, S2102, S2013, S2104, and S2105 in FIG. 2 are same as or similar to S101, S102, S013, S104, and S105 in FIG. 1 respectively, and performing the error correction processing on the initial traffic data can include:

S201, in a case that the initial traffic data is abnormal traffic data, determining first associated traffic data with respect to the initial traffic data; and

S202, performing the error correction processing on the initial traffic data according to an association relationship between the initial traffic data and the first associated traffic data.

In an example, S201 can include: in a case that an original value of the initial traffic data exceeds a threshold range, determining that the initial traffic data is the abnormal traffic data, wherein the threshold range can be obtained by performing machine learning on a plurality of initial traffic data.

For example, the initial traffic data can include speed limit information of a road, wherein speed limit range is 110 km/h-120 km/h. In a case that the speed limit information of the road is outside the speed limit range, it is determined that the speed limit information is the abnormal traffic data, wherein the speed limit range is obtained by performing machine learning on speed limit information samples of a plurality of roads.

In yet another example, S202 can include: determining a normal value of the initial traffic data according to the association relationship between the initial traffic data and the first associated traffic data; replacing the original value with the normal value of the initial traffic data.

For example, in a case that the speed limit information of the road is outside 110 km/h-120 km/h, the grade information of the road is determined to be the fifth grade; and the corresponding speed limit information is determined to be 120 km/h according to the association relationship between the speed limit information and the grade information, and the original value of the speed limit information is replaced with 120 km/h.

On basis of this, more accurate initial traffic data can be provided to the AI analysis model, to improve the accuracy of the AI analysis. It should be noted that since the initial traffic data can be transmitted from the server to the vehicle, abnormal traffic data may be also generated in the transmission process for the initial traffic data, and by performing error correction processing on the abnormal traffic data generated in the transmission process, the influence of network transmission performance on the accuracy of the AI analysis can also be reduced.

In an implementation, the initial traffic data includes first initial traffic data and second initial traffic data, and determining the category of each of the plurality of initial traffic data includes:

S301, determining whether the second initial traffic data is second associated traffic data with respect to the first initial traffic data according to a position relationship between the first initial traffic data and the second initial traffic data; and S302, in a case that the second initial traffic data is the second associated traffic data with respect to the first initial traffic data, setting a category of the second initial traffic data as a category of the first initial traffic data.

In an example, S301 can include:

inputting the first initial traffic data and the second initial traffic data into a position relationship identification model, to identify a position relationship between the first initial traffic data and the second initial traffic data, wherein the position relationship model is obtained by training a deep learning network model based on a plurality of first initial traffic data samples and a plurality of second initial traffic data samples; and determining whether the second initial traffic data is the second associated traffic data with respect to the first initial traffic data according to the identification result.

Illustratively, the first initial traffic data can be shop position information and the second initial traffic data can be road position information. The shop position information and the road position information are input into a position relationship identification model, and it is identified whether the shop is located in a distance threshold range of the road; and it is determined whether the shop position information is second associated traffic data with respect to the road position information according to the identification result. For example, in a case that the shop is located in the distance threshold range of the road, it is determined that the shop position information is second associated traffic data with respect to the road position information; otherwise, the shop position information is not second associated traffic data with respect to the road.

Illustratively, for S302, in the case that the shop position information is the second associated traffic data with respect to the road, the category of the road position information is set to the category of the shop position information, i.e., the road position information and the shop position information are divided into data groups with the same category. The shop position information is associated with the road position information, and the position relationship of the shop with respect to the road can be determined according to the road position information.

In this implementation, the first initial traffic data and the second initial traffic data are correlated through the position relationship between the first initial traffic data and the second initial traffic data, so that on one hand, the calculation amount during categorizing the initial traffic data can be reduced, and it is also beneficial to reduce the calculation amount of the AI analysis model, and improve the efficiency of the AI analysis.

Figure 4:
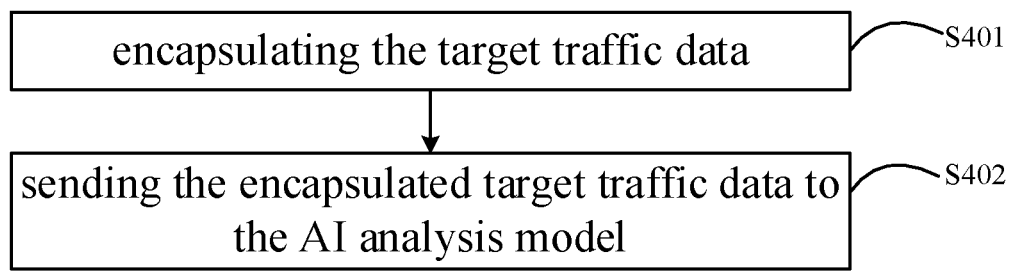
FIG. 4 is a schematic flow diagram of S105 according to an embodiment of the present disclosure.

In an implementation, as shown in FIG. 4, in S105, sending the target traffic data to the AI analysis model can include:

S401, encapsulating the target traffic data; and

S402, sending the encapsulated target traffic data to the AI analysis model.

In an example, the target traffic data can be encapsulated based on categories, such that the same category of target traffic data is encapsulated together, in order to send the target traffic data to the AI analysis model based on the categories.

In an example, all of the target traffic data associated with the AI analysis model can be encapsulated, in order to send the target traffic data to the AI analysis model one-time.

In an implementation, S101 can include:

determining a target object meeting a preset distance condition with respect to a position where a vehicle is located; and acquiring traffic data corresponding to the target object to obtain the initial traffic data.

Wherein, the distance condition can be in an area whose center of circle is the position where the vehicle is located and whose radius is a preset distance. The preset distance can be 1 km, 2 km, 3 km, 5 km, etc. The preset distance condition and the preset distance can be selected and adjusted according to actual requirements, and the embodiment of the present disclosure does not limit the preset distance condition and the preset distance.

Wherein, target objects include, but are not limited to, roads and shops, the target objects can be selected and adjusted according to actual needs, and embodiment the present disclosure dose not limited to the target objects.

In an example, determining a target object meeting a preset distance condition with respect to a position where a vehicle is located can be determining a next road, a surrounding road, and a shop within a circular area of 1 km from the position where the vehicle is located, wherein the distance between the surrounding road and the position where the vehicle is located is greater than the distance between the next road and the position where the vehicle is located.

In yet another example, acquiring traffic data corresponding to the target object to obtain the initial traffic data can be acquiring position information, a name, length information, the number of lanes and distance information of the next road, a name, length information, the number of lanes, steering information and zebra crossing information of the surrounding road, and a name, position information, price information and scoring information of the shop, etc.

The method of the embodiment of the present disclosure can be executed by a vehicle side or can also be executed by a server. In an implementation, before S101, the method can further include: establishing a long communication connection between the vehicle and the server, to receive the initial traffic data pushed by the server or actively request the initial traffic data to the server based on a preset time interval.

In an example, receiving the initial traffic data pushed by the server can include: receiving a pushing request sent by the server; sending position information of the position where the vehicle is located to a server based on the pushing request; and receiving the traffic data corresponding to the target object sent by the server.

Accordingly, the server sends a pushing request based on a preset time interval; in a case of receiving the position information of the position where the vehicle is located, the server determines a target object meeting a preset distance condition with respect to the position where the vehicle is located based on the position information; the server pushes the traffic data corresponding to the target object to the vehicle.

In yet another example, actively requesting the initial traffic data to the server based on a preset time interval can include: sending position information of the position where the vehicle is located to a server based on the preset time interval; and receiving the traffic data corresponding to the target object.

Correspondingly, in a case of receiving the position information of the position where the vehicle is located, the server determines a target object meeting a preset distance condition with respect to the position where the vehicle is located based on the position information; the server pushes the traffic data corresponding to the target object to the vehicle.

Wherein, the server determining a target object meeting a preset distance condition with respect to the position where the vehicle is located based on the position information can be: determining initial objects corresponding to the vehicle identification from a preset object list according to the vehicle identification of the vehicle; and based on the position information, determining a target object meeting a preset distance condition with respect to the position where the vehicle is located from the initial objects. Therefore, the determination efficiency of the target object is improved, so that the initial traffic data can be quickly acquired, and then the efficiency of the AI analysis is improved.

Figure 5:
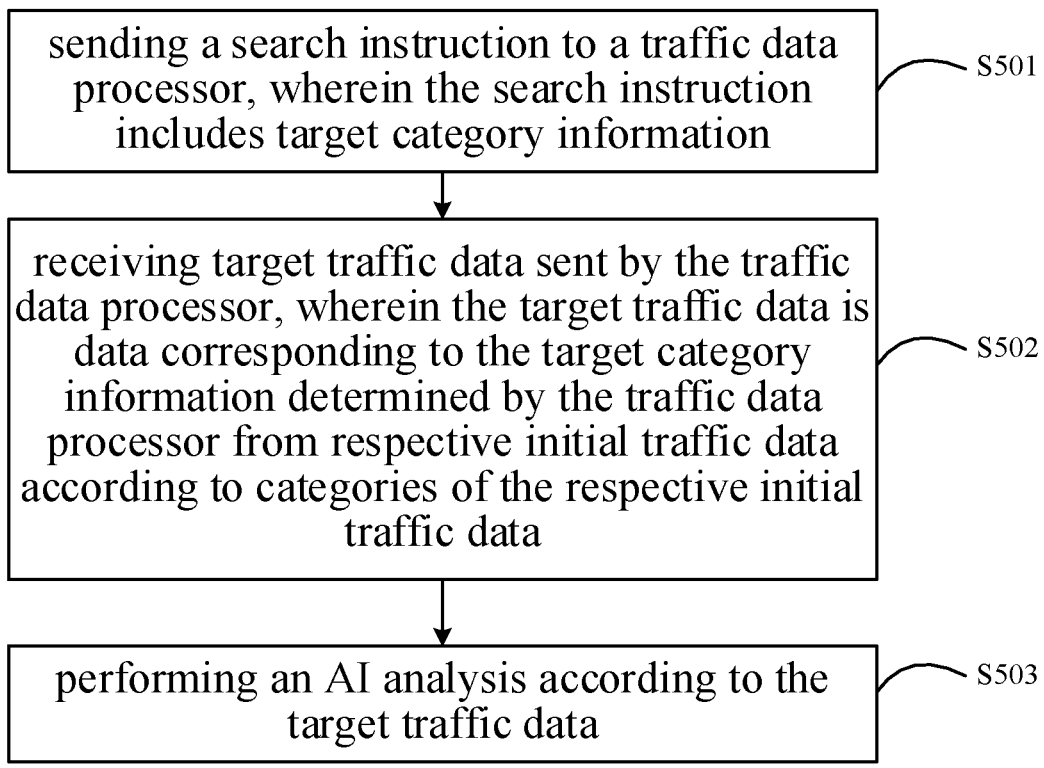
FIG. 5 is a schematic flow diagram of a traffic data analysis method according to another embodiment of the present disclosure.

FIG. 5 is a schematic flow diagram of a traffic data analysis method according to another embodiment of the present disclosure. In a case that the traffic data processor at the vehicle side executes the traffic data analysis method of the above embodiment, the traffic data analysis method of the other embodiment is adapted to be executed by the AI analysis model. As shown in FIG. 5, the traffic data analysis method of the other embodiment can include:

S501, sending a search instruction to a traffic data processor, wherein the search instruction includes target category information;

S502, receiving target traffic data sent by the traffic data processor, wherein the target traffic data is data corresponding to the target category information determined by the traffic data processor from respective initial traffic data according to categories of the respective initial traffic data; and S503, performing an AI analysis according to the target traffic data.

In this implementation, by sending a search instruction to the traffic data processor, the traffic data processor can quickly determine target traffic data from respective initial traffic data based on the target category information, in order to quick receive the target traffic data and perform an AI analysis based on the target traffic data, which can improve the efficiency of the AI analysis.

Further, since the target traffic data can be accurately searched through the correspondences between the AI analysis and categories of the initial traffic data, the analysis method is suitable for a large-scale AI analysis with a plurality of AI analysis models, thereby facilitating the improvement of the diversity of the AI analysis.

Figure 6:
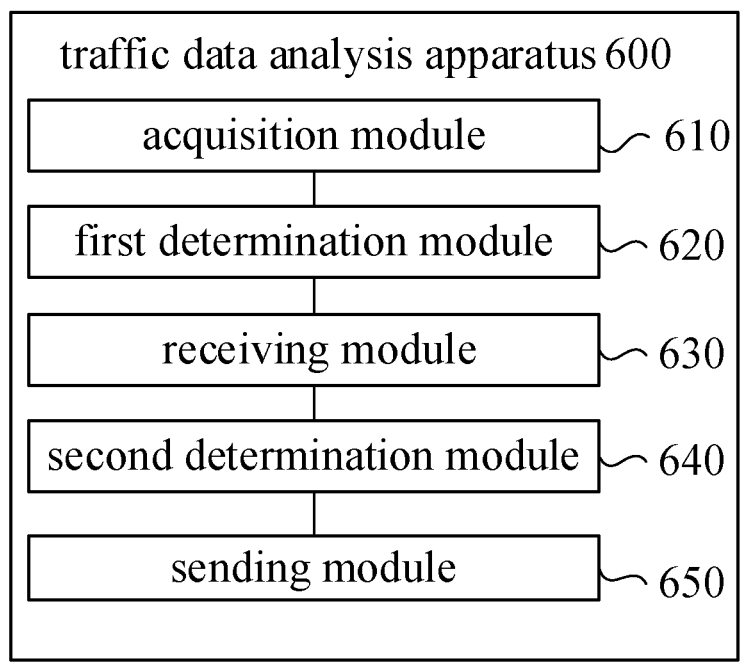
FIG. 6 is a first schematic diagram of a traffic data analysis apparatus according to an embodiment of the present disclosure.

FIG. 6 is a first schematic diagram of a traffic data analysis apparatus 600 of according to an embodiment of the present disclosure. As shown in FIG. 6, the traffic data analysis apparatus 600 can include:

an acquisition module 610 configured for acquiring a plurality of initial traffic data;

a first determination module 620 configured for determining a category of each of the plurality of initial traffic data;

a receiving module 630 configured for receiving a search instruction from an AI analysis model, wherein the search instruction includes target category information;

a second determination module 640 configured for determining target traffic data corresponding to the target category information from the respective initial traffic data according to categories of the respective initial traffic data; and a sending module 650 configured for sending the target traffic data to the AI analysis model so that the AI analysis model performs an AI analysis according to the target traffic data.

Figure 7:
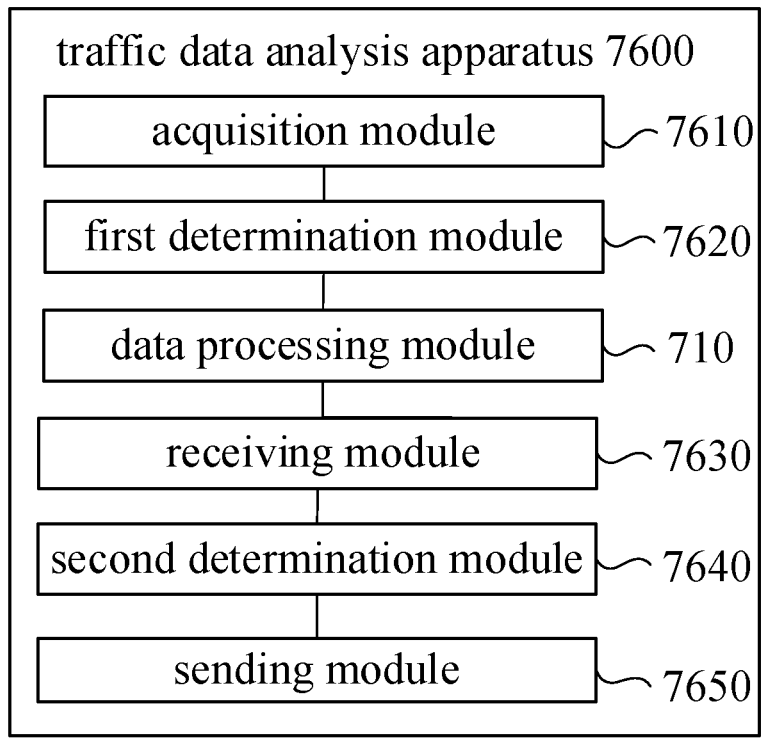
FIG. 7 is a second schematic diagram of a traffic data analysis apparatus according to an embodiment of the present disclosure.

FIG. 7 is a second schematic diagram of a traffic data analysis apparatus 7600 according to an embodiment of the present disclosure. The traffic data analysis apparatus 7600, an acquisition module 7610, a first determination module 7620, a receiving module 7630, a second determination module 7640, and a sending module 7650 in FIG. 7 are same as or similar to the traffic data analysis apparatus 600, the acquisition module 610, the first determination module 620, the receiving module 630, the second determination module 640, and the sending module 650 in FIG. 6 respectively. As shown in FIG. 7, the traffic data analysis apparatus 7600 can further include:

a data processing module 710 configured for performing error correction processing on the initial traffic data.

In an implementation, the data processing module 710 includes:

a first determination sub-module configured for, in a case that the initial traffic data is abnormal traffic data, determining first associated traffic data with respect to the initial traffic data; and an error correction processing sub-module configured for performing the error correction processing on the initial traffic data according to an association relationship between the initial traffic data and the first associated traffic data.

In an implementation, the initial traffic data can include first initial traffic data and second initial traffic data, and the first determination module 620 can include:

a second determination sub-module configured for determining whether the second initial traffic data is second associated traffic data with respect to the first initial traffic data according to a position relationship between the first initial traffic data and the second initial traffic data; and a category setting sub-module configured for, in a case that the second initial traffic data is the second associated traffic data with respect to the first initial traffic data, setting a category of the second initial traffic data as a category of the first initial traffic data.

In an implementation, the sending module 650 can include:

an encapsulating sub-module configured for encapsulating the target traffic data; and a sending sub-module configured for sending the encapsulated target traffic data to the AI analysis model.

In an implementation, the acquisition module 610 can include:

a third determination sub-module configured for determining a target object meeting a preset distance condition with respect to a position where a vehicle is located; and an acquisition sub-module configured for acquiring traffic data corresponding to the target object to obtain the initial traffic data.

Figure 8:
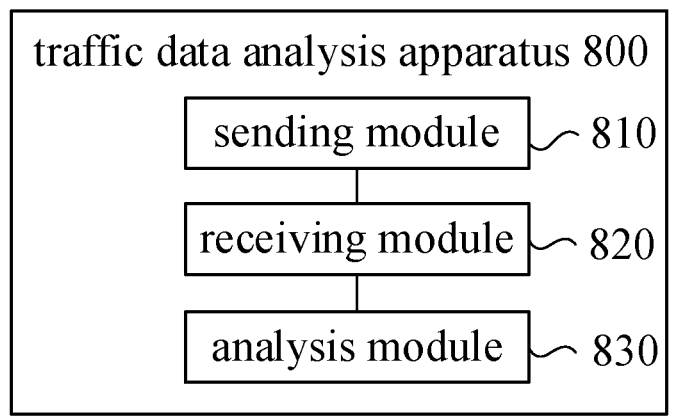
FIG. 8 is a schematic diagram of a traffic data analysis apparatus according to another embodiment of the present disclosure.

FIG. 8 is a schematic diagram of a traffic data analysis apparatus 800 according to another embodiment of the present disclosure. As shown in FIG. 8, the traffic data analysis apparatus 800 can include:

a sending module 810 configured for sending a search instruction to a traffic data processor, wherein the search instruction includes target category information;

a receiving module 820 configured for receiving target traffic data sent by the traffic data processor, wherein the target traffic data is data corresponding to the target category information determined by the traffic data processor from respective initial traffic data according to categories of the respective initial traffic data; and an analysis module 830 configured for performing an AI analysis according to the target traffic data.

Figure 9:
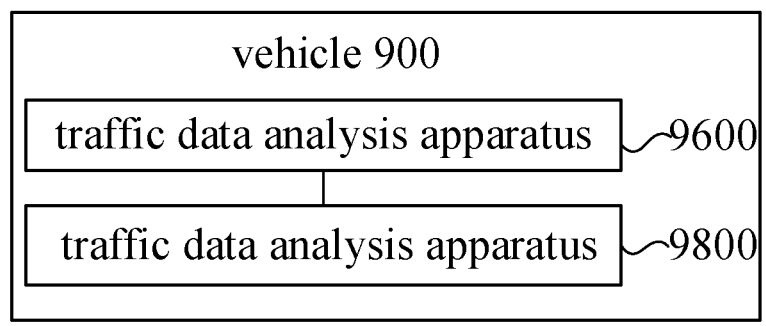
FIG. 9 is a schematic diagram of a vehicle according to an embodiment of the present disclosure.

FIG. 9 is a schematic diagram of a vehicle according to an embodiment of the present disclosure. As shown in FIG. 9, the vehicle 900 can include: the traffic data analysis apparatus 9600 of any one of the above implementations and the traffic data analysis apparatus 9800 of another implementation. The traffic data analysis apparatus 9600 and the traffic data analysis apparatus 9800 in FIG. 9 are same as or similar to the traffic data analysis apparatus 600 in FIG. 6 and the traffic data analysis apparatus 800 in FIG. 8 respectively.

The functions of respective modules in respective apparatuses of the embodiment of the present disclosure can be referred to the corresponding description in the above method, and will not be described in detail herein.

According to embodiments of the present disclosure, the present disclosure also provides an electronic device, a readable storage medium, and a computer program product.

Figure 10:
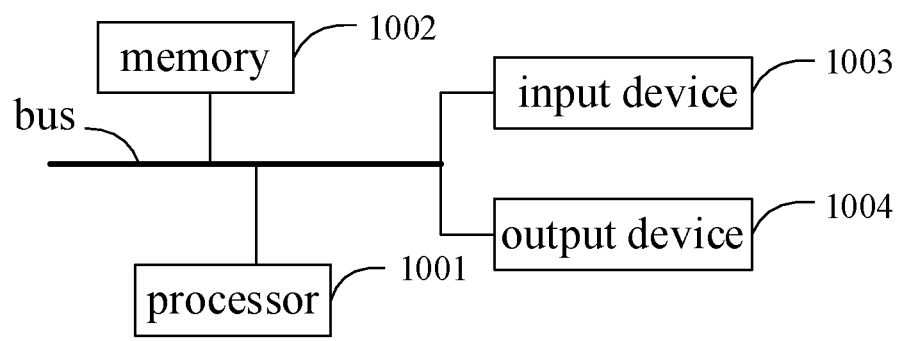
FIG. 10 is a block diagram of an electronic device for implementing traffic data analysis methods according to embodiments of the present disclosure.

As shown in FIG. 10, FIG. 10 is a block diagram of an electronic device for traffic data analysis methods according to embodiments of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processing, cellular telephone, smart phone, wearable device, and other similar computing apparatuses. The parts, connections and relationships thereof, and functions thereof shown herein are merely examples and are not intended to limit the implementation of the present disclosure described and/or claimed herein.

As shown in FIG. 10, the electronic device includes: one or more processors 1001, memory 1002, and interfaces for connecting various parts, including a high-speed interface and a low-speed interface. The various parts are connected to each other using different buses and can be installed on a common motherboard or installed in other ways as needed. The processor can process instructions executed within electronic device, including instructions stored in the memory or on the memory to display graphical information of the GUI on an external input/output device, (such as display device coupled to an interface). In other implementations, a plurality of processors and/or a plurality of buses can be used with a plurality of memories, if desired. Similarly, a plurality of electronic devices can be connected, each device providing a part of necessary operations (e.g., as a server array, a group of blade servers or a multiprocessor system). In FIG. 10, one processor 1001 is taken as an example.

Memory 1002 is a non-transitory computer-readable storage medium provided by the present disclosure. Wherein, the memory stores instructions executable by at least one processor to cause the at least one processor to execute the traffic data analysis methods provided by the present disclosure. The non-transitory computer-readable storage medium of the present disclosure stores computer instructions for causing a computer to execute the traffic data analysis methods provided by the present disclosure.

Memory 1002, as a non-transitory computer-readable storage medium, can be used to store non-transitory software programs, non-transitory computer-executable programs, and modules, such as program instructions/modules corresponding to the traffic data analysis methods in embodiments of the present disclosure (e.g., the acquisition module 610, the receiving module 620, the first determination module 630, the second determination module 640, and the sending module 650 shown in FIG. 6). The processor 1001 executes various functional applications and data processing of the server, i.e., implementing the traffic data analysis methods in the above method embodiments, by executing non-transitory software programs, instructions, and modules stored in the memory 1002.

The memory 1002 can include a storage program area and a storage data area, wherein the storage program area can store an operating system and an application program required by at least one function; the storage data area can store data created according to the use of the electronic device for the traffic data analysis methods, etc. In addition, the memory 1002 can include a high speed random access memory, and can also include non-transitory memory, such as at least one magnetic disk storage component, a flash memory component, or other non-transitory solid state storage components. In some embodiments, the memory 1002 can optionally include memories set remotely provided relative to the processor 1001, and these remote memories can be connected to the electronic device for the traffic data analysis methods via a network. Instances of the above network include, but are not limited to, the Internet, an intranet, a local area network, a mobile communication network, and combinations thereof The electronic device for the traffic data analysis methods can further include: an input device 1003 and an output device 1004. The processor 1001, the memory 1002, the input device 1003, and the output device 1004 can be connected by a bus or other means. In FIG. 10, the connection through a bus is taken as an example.

The input device 1003, such as a touch screen, a keypad, a mouse, a trackpad, a touchpad, an indication rod, one or more mouse buttons, a trackball, a joystick, etc., can receive input numeric or character information and generate key signal inputs relating to user settings and functional controls of the electronic device for the traffic data analysis methods. The output device 1004 can include display equipment, an auxiliary lighting device (e.g., an LED), a tactile feedback device (e.g., a vibration motor), etc. The display equipment can include, but is not limited to, a liquid crystal display (LCD), a light emitting diode (LED) display, and a plasma display. In some implementations, the display device can be a touch screen.

Various implementations of the system and technology described herein can be implemented in a digital electronic circuit system, an integrated circuit system, an application specific ASIC (application specific integrated circuit), computer hardware, firmware, software, and/or combination thereof. These various implementations can include: implementing in one or more computer programs, which can be executed and/or interpreted on a programmable system including at least one programmable processor. The programmable processor can be a dedicated or general-purpose programmable processor that can receive data and instructions from a storage system, at least one input device, and at least one output device, and transmit the data and instructions to the storage system, the at least one input device, and the at least one output device.

These computing programs (also referred to as program, software, software applications, or code) include machine instructions of a programmable processor, and these computer programs can be implemented using a high-level process and/or an object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including the machine-readable medium that receives machine instructions as machine-readable signals. The term "machine-readable signal" refers to any signal used to provide machine instructions and/or data to a programmable processor.

In order to provide the interaction with a user, the system and technology described herein can be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user can provide input to the computer. Other types of apparatus can also be used to provide the interaction with a user: for example, the feedback provided to the user can be any form of sensory feedback (e.g., visual feedback, auditory feedback, or tactile feedback); and input from the user can be received in any form (including acoustic input, voice input, or tactile input).

The system and technology described herein can be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user can interact with implementations of the system and technology described herein) that includes a front-end part, or be implemented in a computing system that includes any combination of such background part, middleware part, or front-end part. The parts of the system can be interconnected by any form or medium of the digital data communication (e.g., a communication network). Examples of the communication network include: a Local Area Networks (LAN), a Wide Area Network (WAN), and the Internet.

A computer system can include a client and a server. The client and server are typically remote from each other and typically interact through a communication network. The relationship of the client and the server is generated by computer programs running on respective computers and having a client-server relationship with each other. The server can be a cloud server, also called a cloud computing server or a cloud host, which is a host product in a cloud computing service system, to solve the defects of high management difficulty and weak business expansibility in a traditional physical host and a virtual private server (VPS) service. The server can also be a server of a distributed system, or a server incorporating a chain of blocks.

It should be understood that various forms of processes shown above can be used to reorder, add, or delete steps. For example, respective steps recorded in the present disclosure can be executed in parallel, or can be executed sequentially, or can be executed in a different order, so long as the desired result of the technical solution provided in the present disclosure can be achieved, no limitation is made herein.

The above-mentioned specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement, and the like made within the spirit and principle of the present disclosure shall be included within the protection scope of the present disclosure.

What is claimed is:

1. A traffic data analysis method, comprising:
   acquiring, by a traffic data processor, a plurality of initial traffic data;
   determining, by the traffic data processor, a category of each of the plurality of initial traffic data;
   receiving, by the traffic data processor, a search instruction from an AI analysis model, wherein the search instruction comprises target category information;
   determining, by the traffic data processor, target traffic data corresponding to the target category information from the respective initial traffic data according to categories of the respective initial traffic data; and
   sending, by the traffic data processor, the target traffic data to the AI analysis model so that the AI analysis model performs an AI analysis according to the target traffic data,
   wherein the traffic data analysis method further comprises:
   sending, by the AI analysis model, the search instruction to the traffic data processor;
   receiving, by the AI analysis model, the target traffic data sent by the traffic data processor; and
   performing, by the AI analysis model, an AI analysis according to the target traffic data.

2. The method of claim 1, wherein before determining the target traffic data corresponding to the target category information from the respective initial traffic data according to the categories of the respective initial traffic data, the method further comprises:
   performing error correction processing on the initial traffic data.

3. The method of claim 2, wherein the performing the error correction processing on the initial traffic data comprises:
   in a case that the initial traffic data is abnormal traffic data, determining first associated traffic data with respect to the initial traffic data; and
   performing the error correction processing on the initial traffic data according to an association relationship between the initial traffic data and the first associated traffic data.

4. The method of claim 2, wherein the acquiring the plurality of initial traffic data comprises:
   determining a target object meeting a preset distance condition with respect to a position where a vehicle is located; and
   acquiring traffic data corresponding to the target object to obtain the initial traffic data.

5. An electronic device, comprising:
   at least one processor; and
   a memory communicatively connected to the at least one processor, wherein
   the memory stores instructions executable by the at least one processor, and the instructions are executed by the at least one processor, to enable the at least one processor to execute the method of claim 4.

6. A non-transitory computer-readable storage medium storing computer instructions, wherein the computer instructions are configured for causing a computer to execute the method of claim 4.

7. The method of claim 3, wherein the acquiring the plurality of initial traffic data comprises:
determining a target object meeting a preset distance condition with respect to a position where a vehicle is located; and
acquiring traffic data corresponding to the target object to obtain the initial traffic data.

8. The method of claim 1, wherein the initial traffic data comprises first initial traffic data and second initial traffic data, and the determining the category of each of the plurality of initial traffic data comprises:
determining whether the second initial traffic data is second associated traffic data with respect to the first initial traffic data according to a position relationship between the first initial traffic data and the second initial traffic data; and
in a case that the second initial traffic data is the second associated traffic data with respect to the first initial traffic data, setting a category of the second initial traffic data as a category of the first initial traffic data.

9. The method of claim 8, wherein the acquiring the plurality of initial traffic data comprises:
determining a target object meeting a preset distance condition with respect to a position where a vehicle is located; and
acquiring traffic data corresponding to the target object to obtain the initial traffic data.

10. The method of claim 1, wherein the sending the target traffic data to the AI analysis model comprises:
encapsulating the target traffic data; and
sending the encapsulated target traffic data to the AI analysis model.

11. The method of claim 1, wherein the acquiring the plurality of initial traffic data comprises:
determining a target object meeting a preset distance condition with respect to a position where a vehicle is located; and
acquiring traffic data corresponding to the target object to obtain the initial traffic data.

12. An electronic device, comprising:
at least one processor; and
a memory communicatively connected to the at least one processor, wherein
the memory stores instructions executable by the at least one processor, and the instructions are executed by the at least one processor, to enable the at least one processor to execute the method of claim 1.

13. A non-transitory computer-readable storage medium storing computer instructions, wherein the computer instructions are configured for causing a computer to execute the method of claim 1.

14. A vehicle, comprising: a first electronic device and a second electronic device;
wherein the first electronic device comprising:
at least one first processor; and
a first memory communicatively connected to the at least one first processor, wherein
the first memory stores first instructions executable by the at least one first processor, and the first instructions are executed by the at least one first processor to enable the at least one first processor to perform operations of:
acquiring a plurality of initial traffic data;
determining a category of each of the plurality of initial traffic data;
receiving a search instruction from an AI analysis model, wherein the search instruction comprises target category information;
determining target traffic data corresponding to the target category information from the respective initial traffic data according to categories of the respective initial traffic data; and
sending the target traffic data to the AI analysis model so that the AI analysis model performs an AI analysis according to the target traffic data;
the second electronic device comprising:
at least one second processor; and
a second memory communicatively connected to the at least one second processor, wherein
the second memory stores second instructions executable by the at least one second processor, and the second instructions are executed by the at least one second processor, to enable the at least one second processor to perform operations of:
sending a search instruction to a traffic data processor, wherein the search instruction comprises target category information;
receiving target traffic data sent by the traffic data processor, wherein the target traffic data is data corresponding to the target category information determined by the traffic data processor from respective initial traffic data according to categories of the respective initial traffic data; and
performing an AI analysis according to the target traffic data.

15. The vehicle of claim 14, wherein before determining the target traffic data corresponding to the target category information from the respective initial traffic data according to the categories of the respective initial traffic data, the first instructions are executed by the at least one first processor to enable the at least one first processor to further perform an operation of:
performing error correction processing on the initial traffic data.

16. The vehicle of claim 15, wherein when the first instructions are executed by the at least one first processor to enable the at least one first processor to perform the error correction processing on the initial traffic data, the first instructions are executed by the at least one first processor to enable the at least one first processor to specifically perform operations of:
in a case that the initial traffic data is abnormal traffic data, determining first associated traffic data with respect to the initial traffic data; and
performing the error correction processing on the initial traffic data according to an association relationship between the initial traffic data and the first associated traffic data.

17. The vehicle of claim 14, wherein the initial traffic data comprises first initial traffic data and second initial traffic data, and when the first instructions are executed by the at least one first processor to enable the at least one first processor to determine the category of each of the plurality of initial traffic data, the first instructions are executed by the at least one first processor to enable the at least one first processor to specifically perform operations of:
determining whether the second initial traffic data is second associated traffic data with respect to the first initial traffic data according to a position relationship between the first initial traffic data and the second initial traffic data; and in a case that the second initial traffic data is the second associated traffic data with respect to the first initial traffic data, setting a category of the second initial traffic data as a category of the first initial traffic data.

18. The vehicle of claim 14, wherein when the first instructions are executed by the at least one first processor to enable the at least one first processor to send the target traffic data to the AI analysis model, the first instructions are executed by the at least one first processor to enable the at least one first processor to specifically perform operations of:

encapsulating the target traffic data; and sending the encapsulated target traffic data to the AI analysis model.

19. The vehicle of claim 14, wherein when the first instructions are executed by the at least one first processor to enable the at least one first processor to acquire the plurality of initial traffic data, the first instructions are executed by the at least one first processor to enable the at least one first processor to specifically perform operations of:

determining a target object meeting a preset distance condition with respect to a position where a vehicle is located; and acquiring traffic data corresponding to the target object to obtain the initial traffic data.

* * * * *